Aug. 21, 1973 H. A. DONCK 3,753,855
MODULAR FUEL ROD SPACER ASSEMBLY FOR NUCLEAR
REACTOR FUEL ASSEMBLIES
Filed June 15, 1970 4 Sheets-Sheet 1

INVENTOR
HARRY A. DONCK

BY
Pennie, Edmonds, Morton,
Taylor & Adams
ATTORNEYS

INVENTOR
HARRY A. DONCK

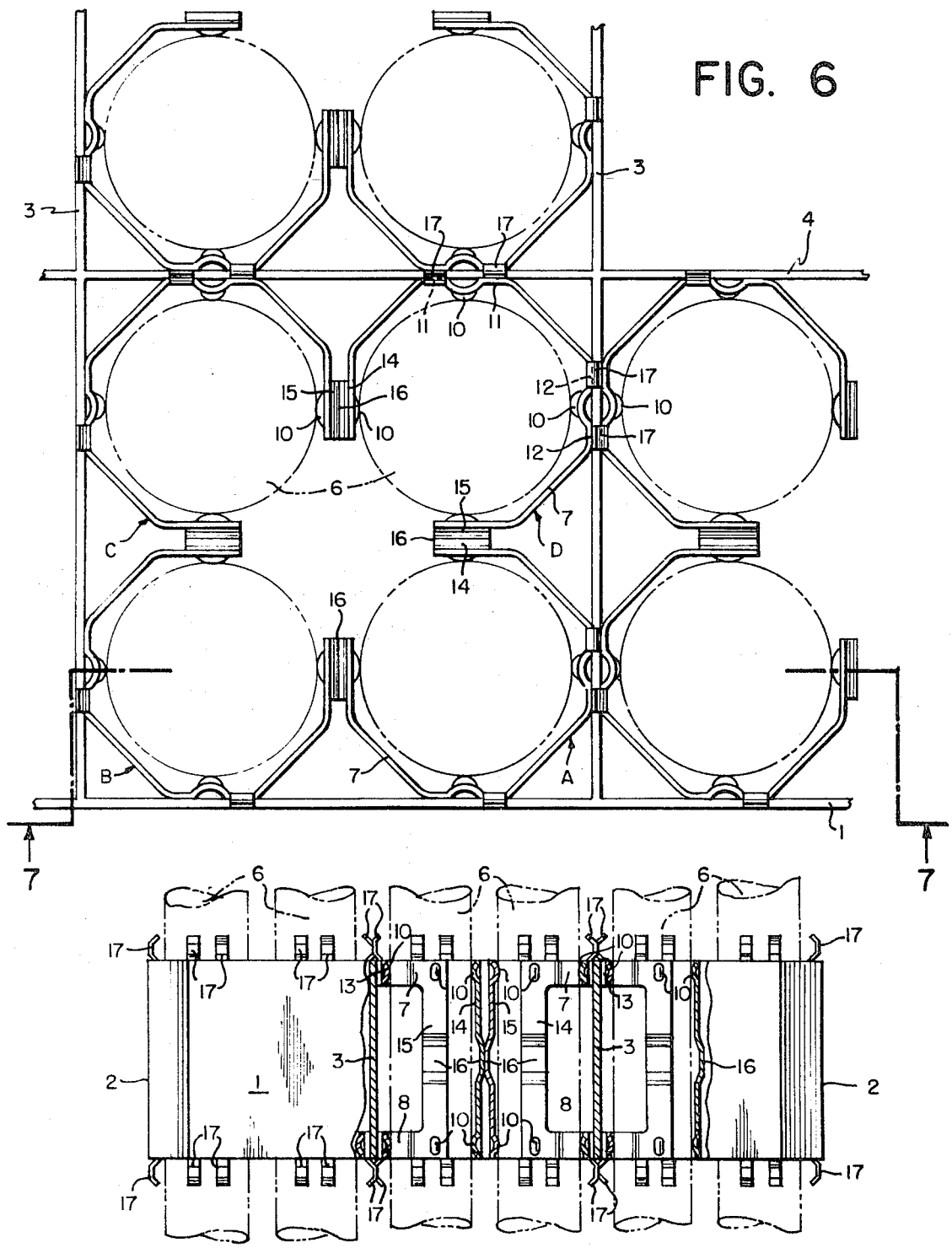

Aug. 21, 1973     H. A. DONCK     3,753,855
MODULAR FUEL ROD SPACER ASSEMBLY FOR NUCLEAR
REACTOR FUEL ASSEMBLIES

Filed June 15, 1970                                      4 Sheets—Sheet 4

INVENTOR
HARRY A. DONCK

BY
ATTORNEYS

United States Patent Office 3,753,855
Patented Aug. 21, 1973

3,753,855
MODULAR FUEL ROD SPACER ASSEMBLY FOR NUCLEAR REACTOR FUEL ASSEMBLIES
Harry A. Donck, New York, N.Y., assignor to United Nuclear Corporation, Elmsford, N.Y.
Filed June 15, 1970, Ser. No. 46,234
Int. Cl. G21c 3/34
U.S. Cl. 176—78
9 Claims

ABSTRACT OF THE DISCLOSURE

A fuel rod spacer assembly comprises a cellular spacer array and, for each fuel rod, a bearing clip comprising a pair of linked split ring rod embracing portions proportioned to extend around substantially more than 180° of the rod circumference. A pair of spring tabs on the split rings are provided for releasably engaging the cellular spacing array in order to prevent longitudinal displacement of the bearing clip. This spacer assembly can be easily fabricated because the bearing clips need not be formed as a part of the cellular array. The fuel rods can be transversely loaded into the bearing clips and longitudinally loaded into the cellular array without contact against tight, previously-fixed spacers.

BACKGROUND OF THE INVENTION

This invention relates to a nuclear reactor fuel rod spaced assembly which is relatively easy to fabricate and which permits the fabrication of fuel rod assemblies with substantially reduced damage to the fuel rod cladding.

Nuclear reactors are the principal means for converting the large amounts of energy released by nuclear fission into useful thermal energy. When a fissionable atom such as $U^{233}$, $U^{235}$, $Pu^{239}$, or $Pu^{241}$ absorbs a thermal neutron, there is a high probability that it will undergo nuclear fission, splitting into two fission products of lower atomic weight having great kinetic energy and emitting a number of neutrons. In a nuclear reactor, the kinetic energy of the fission products is dissipated as heat in the nuclear fuel elements are removed from the reactor by a coolant in heat exchange relationship with the fuel elements. The fission neutrons are slowed down to the thermal range by a moderator and, in turn, used to induce a subsequent fission in another atom in order to keep the reaction self-sustaining.

A typical water-moderated nuclear reactor comprises, in essence, a reactor pressure vessel and a nuclear chain reacting core made up of a number of nuclear fuel element assemblies. Each fuel assembly comprises a bundle of rod-type nuclear fuel elements—typically zirconium alloy tubes filled with enriched uranium oxide. Water is pumped through a nozzle at the bottom of the assembly to circulate through it and around the fuel rods. The water performs the dual function of removing heat and acting as a neutron moderator. The water leaves the assembly through a top nozzle and is used to produce steam for driving a turbine.

In order to maintain a high level of power generation, it is important to provide intermediate fuel rod spacer assemblies to maintain precise spacing between adjacent rods in an assembly and to prevent bowing of the rods due to thermally induced loads. These spacing assemblies typically comprise a cellular spacing array including a plurality of positioning buttons and leaf springs for spacing a plurality of fuel rods within each cell. These conventional spacers, due largely to the difficulty of forming the leaf spring arrangements within the individual cells, are relatively costly to produce. In addition, because the fuel assemblies are typcally fabricated by longitudinally inserting the fuel rods into the already formed spaces, they often introduce gouges and longitudinally extending scratches in the fuel cladding. As is well known in the nuclear reactor art, even slight damage to the fuel cladding can become extremely troublesome.

SUMMARY OF THE INVENTION

In accordance with the present invention, a fuel rod spacer assembly comprises a cellular spacer array and, for each fuel rod, a bearing clip comprising a pair of linked split ring rod-embracing portions proportioned to extend around substantially more than 180° of the rod circumference. A pair of spring tabs on the split rings are provided for releasably engaging the cellular spacing array in order to prevent longitudinal displacement of the bearing clip. This spacer assembly can be easily fabricated because the bearing clips need not be formed as a part of the cellular array. The fuel rods can be transversely loaded into the bearing clips and longitudinally loaded into the cellular array without contact against tight, previously-fixed spacers.

BRIEF DESCRIPTION OF THE DRAWINGS

A full understanding of the invention may be had from the following detailed description of particular embodiments together with reference to the accompanying drawings in which:

FIG. 6 is a partial plan view similar to FIG. 5, but showing all bearing clips in their home positions;

FIG. 7 is a side elevation, partly in section, of a fuel rod spacer assembly in accordance with the invention, the sectioned part being taken along the lines 7—7 of the partial plan view of FIG. 6;

DETAILED DESCRIPTION

Figure 1:
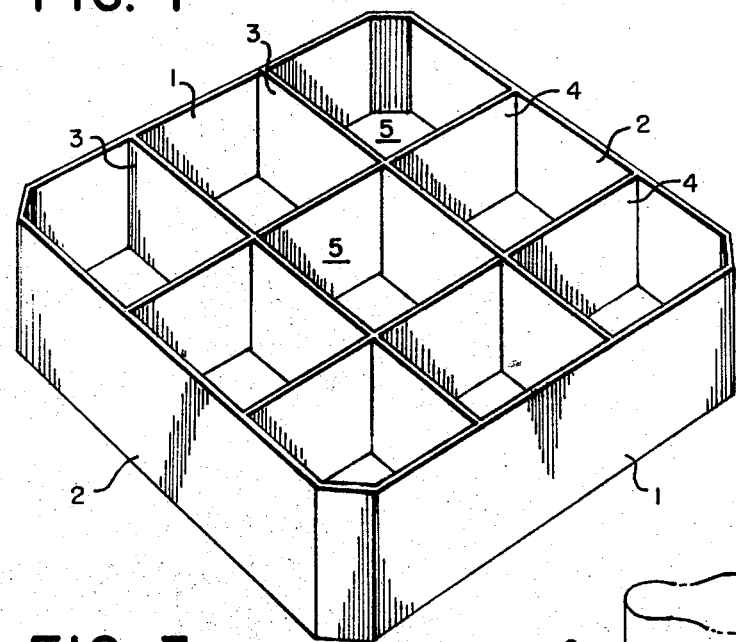
FIG. 1 is a perspective of a cellular fuel rod spacer structure of a type that may be used in conjunction with the invention.

As illustrated in FIG. 1, a fuel rod spacer in accordance with the invention utilizes a very simple "egg-crate" type of cellular structure comprising opposed pairs of peripheral walls 1 and 2, a plurality of interior walls 3 extending between peripheral walls 1 and other interior walls 4 which extend between peripheral walls 2 and intersect interior walls 3 such that the interior of the structure is subdivided into a plurality of cells 5. It will be understood by those skilled in the art that the lengths of the peripheral walls 1 and 2 are such as to surround the parallel array of fuel rods in a reactor fuel assembly and that the interior walls 3 and 4 traverse the array of fuel rods at spaced locations such that sub-groups of one or more of the rods in the array are surrounded by the portions of the peripheral and interior walls forming the individual cells 5.

The walls of the spacer structure are preferably made of a material such as zirconium alloy which has good metallurgical and nuclear properties. Moreover, as will become apparent, the simplicity of the complete fuel spacer according to the invention affords ample opportunity for perforating both the peripheral and interior walls to enhance the circulation of coolant through the spacer and to reduce the mass of neutron absorbing material.

Figure 8:
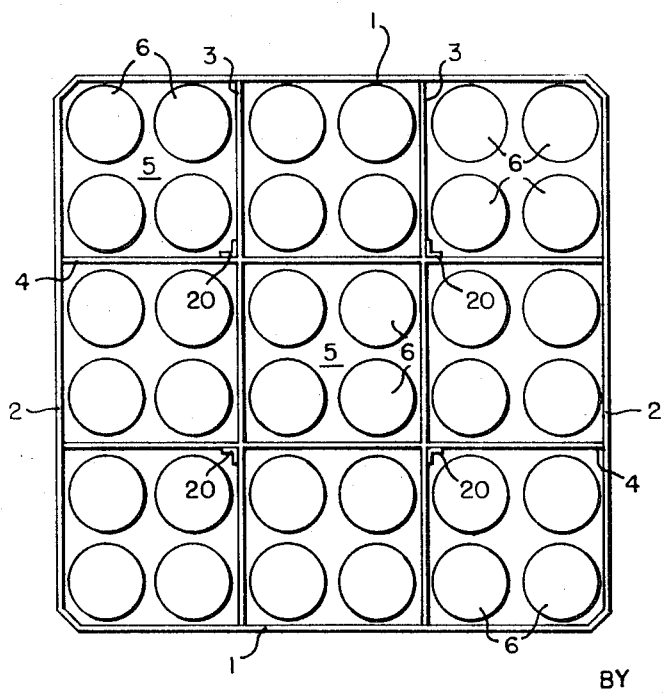
FIG. 8 illustrates the application of the invention to a reactor fuel assembly in which the fuel rods are arranged in a numerically even, square array.

The specific spacer structure described thus far is particularly adapted for use in a fuel rod assembly in which the total number of fuel rods are disposed in a numerically even square array, for example, a total of thirty-six rods disposed in a six-by-six array such as is illustrated in more detail in FIG. 8 where the individual fuel rods are designated by the reference numeral 6. As there are two evenly spaced interior walls 3 and two evenly spaced interior walls 4, the entire space bounded by peripheral walls 1 and 2 is divided into a total of nine individual cells in a three-by-three array, and each cell surrounds a sub-group of four fuel rods. Although the invention is shown in FIG. 8 as applied to an even square array, it is to be understood that it is equally applicable to even rectangular arrays such as forty-eight rods in a six-by-eight array, one hundred and sixty rods in a ten-by-sixteen array, etc. The applicability of the invention to numerically odd arrays of fuel rods will be illustrated in connection with FIGS. 9 and 10.

Figure 3:
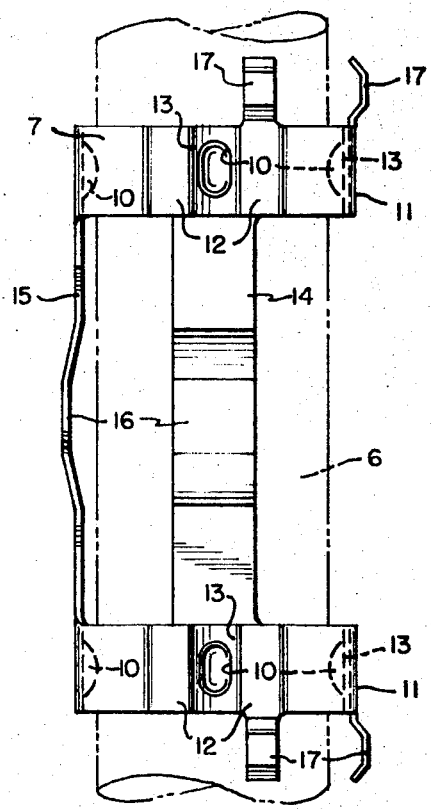
FIG. 3 is a side elevation taken in the direction indicated by the arrows 3—3 in FIG. 2.
Figure 2:
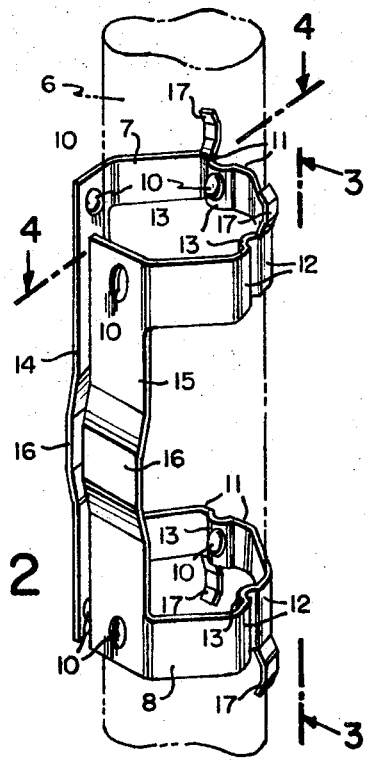
FIG. 2 is a perspective view of a modular bearing clip in accordance with the invention.
Figure 4:
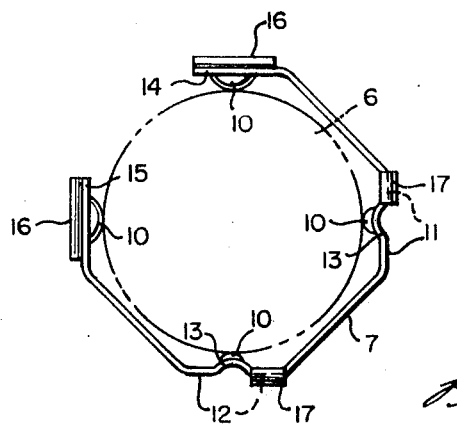
FIG. 4 is a plan view taken along the lines 4—4 in FIG. 2.

None of the fuel rods 6 in the array bears directly against another rod or against the "egg crate" structure; rather, maintenance of the design space between adjacent rods and spacer walls and the support for the rods is provided by an easily and economically manufactured bearing clip for each rod. A specific form of bearing clip in accordance with the invention is illustrated in FIGS. 2, 3, and 4 in which a section of a fuel rod 6 is shown in broken outline. This clip comprises top and bottom rod embracing portions 7 and 8, each of which is made of a good spring material such as a nickel-chromium alloy sold under the trade name "Inconel." The form of each rod embracing portion is generally that of a split ring proportioned to extend around a fuel rod 6 through substantially more than 180°. The objective is, in accordance with the invention, to firmly grasp the fuel rod in these split rings, but not to enclose them within an unexpansible solid ring. In the specific embodiment illustrated in FIGS. 2–4, each split ring extends through approximately 270° about the central axis of the rod.

Each spring portion is provided with inwardly extending rod engaging portions 10 which may be conveniently formed by dimpling the ring. It is advantageous to form four of these rod engaging portions at equally spaced locations about the spring at positions which are angularly separated from each other by approximately 90°. Thus, the bearing between each ring and the fuel rod is at four places, each of which is essentially a point or line contact and the ring itself is held away from the rod and is substantially coaxial with the rod. The spring portions are also provided on their outer surfaces with bearing lands 11 and 12 at two places separated by approximately 90° about the axis of the spring portions. As illustrated, one of the rod engaging portions 10 is formed at the location of the lands 11 and another is formed at the location of the lands 12. Inasmuch as each of these lands bears against a wall of the spacer structure, it is advantageous to provide for circulation of coolant behind the rod engaging portion 10 so that a "hot spot" or region of excessive temperature does not develop at the area of contact of the rod and the engaging portion. This is readily accomplished by providing a small semi-circular inward bend 13 in the spring portion between the two land surfaces 11 and also between the land surfaces 12.

Split rings 7 and 8 are joined together at their corresponding free ends by linking members 14 and 15. These members are made of a resilient material and are provided at locations intermediate their ends with bearing sections 16 (for resiliently engaging the bearing sections of adjacent clips) extending radially outward beyond the peripheries of split rings 7 and 8.

Finally, the bearing clip is provided with means for releasably engaging the "egg crate" structure to prevent the bearing clip from being driven out of the confines of the structure by the flow of coolant past the clip in the specific embodiment shown. These are spring tabs 17 on the upper edge of split ring 7 and on the lower edge of split ring 8. These are located at positions about 90° apart and adjacent the lands 11 and 12 on each ring. The split rings 7 and 8 are spaced from each other by approximately the width of the walls of the "egg crate" structure so that one spring tab on split ring 7 and the correspondingly positioned spring tab on split ring 8 overhang the opposite edges of an adjacent wall of the structure to act as detents and prevent displacement of the bearing clip longitudinally of the fuel rod.

Although the fuel rod embracing portions 7 and 8 have been described generically as being semi-cylindrical and the several parts of the bearing clip have been described separately, it is preferred to form the entire bearing clip as a unitary component. It may be manufactured from a single sheet of metal by conventional stamping techniques and then bent into final shape by forming the rod embracing rings into either regular or irregular open polygons. The purpose of omitting a side of the polygon or, more broadly, of forming the rod embracing portions into split rings, is twofold: (1) to permit the clip to be expanded so that a fuel rod may be inserted into it without having the rod engaging surfaces 10 scrape along and mar the surface of a substantial length of the rod; (2) to permit the bearing clip to expand and contract with the thermally induced expansions and other motions of the fuel rod.

The function of the "egg crate" structure in combination with a plurality of the bearing clips described above is to assure that the prescribed spacing is maintained among the several fuel rods of a fuel rod assembly by providing lateral support for the rods at one or more positions intermediate the ends of the rods. Other means known in the art, such as headers and thrust plates, are used to position and provide support for the ends of the rods in the array.

Figure 5:
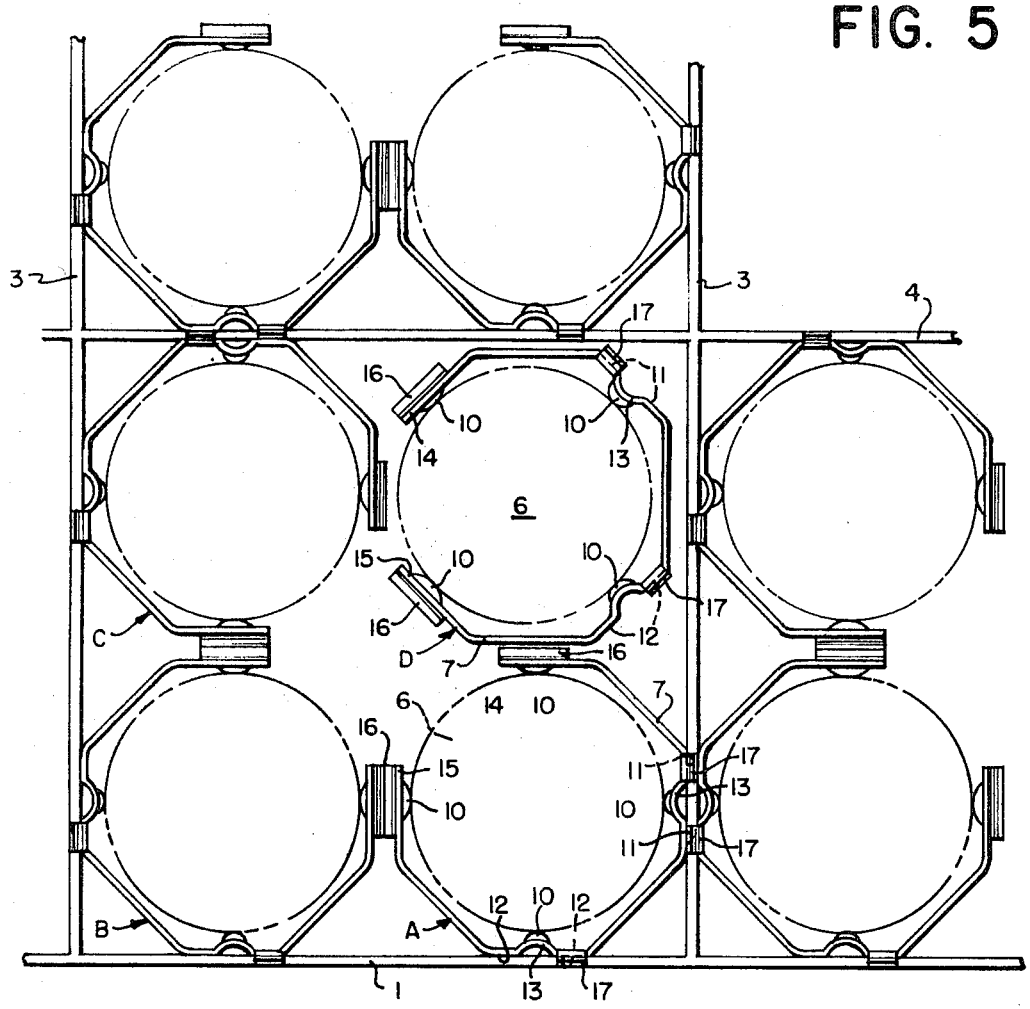
FIG. 5 is a partial plan view of adjacent cells of a fuel rod spacer assembly in accordance with the invention showing one bearing clip in the angular position which permits easy passage through a "foreign" spacer into the "home" spacer.

One of the features of this invention is the ease with which the fuel rods may be assembled into the intermediate spacers without scratching or otherwise damaging the relatively soft surfaces of the fuel rod cladding material. The positions the spacers will assume in the final assembly are marked out on a suitable work table and the "egg crate" structures are set up on their sides at the prescribed locations with their cells in alignment. The bearing clips are assembled onto the individual fuel rods at locations spaced apart by the same distances as are the "egg crate" structures on the work table. This is easily accomplished by springing the clips slightly open so that the rods may be axially assembled without scraping against the rod engaging portions 10. All clips on a rod should be identically oriented about the axis of the rod before the clips are permitted sufficiently to spring closed against the rod. This will facilitate insertion of the rods into the "egg crate" structures. Now the rods with the bearing clips in place are passed longitudinally through the cells of the several "foreign" egg crate structures until each clip is positioned within the cell of its own particular "home" egg crate. That this may be readily done is best illustrated in FIGS. 5 and 6. For purposes of illustration, one may assume that the clip designated A was the first clip to enter the cell shown in FIG. 5 and that it is in its "home" position as shown. Note that the lands 11 and 12 on the split rings 7 and 8 bear against the wall of the "egg crate" structure.

The second, third, and fourth clips to enter the cell (designated B, C, and D) would encounter interference with the walls and the clip or clips already in the cell if one attempted to insert them while they were oriented about the axis of the rod in the "home" position. However, there is ample clearance for the passage of each of the clips if the rods bearing these clips are simply rotated approximately 45° about their longitudinal axes so that the clips are oriented as is clip D in FIG. 5. In this position, each clip on the rod may readily be guided through the cells of the foreign egg crate structures until it arrives at that structure in which it is to be permanently located. It is then rotated back 45° and snapped into position. This simple procedure is illustrated by comparison of the position of clip D in FIG. 5 with the position of the corresponding clip D in FIG. 6.

In FIG. 6, all clips on the several rods are in their "home" positions, and it is evident that the bearing sections 16, of adjacent linking members 14 and 15 provide restraint against lateral displacement. Moreover, when the bearing clips are in their "home" positions, they are individually restrained against displacement out of the cell by engagement of the spring tabs 17 on the split rings 7 and 8 with the edges of the "egg crate" structure walls. This is best illustrated in FIG. 7.

As previously stated, the invention is readily applicable to reactor fuel assemblies in which the fuel rods are arranged in either numerically even or numerically odd arrays, and the arrays may be either square or rectangular. FIG. 8 is an illustration of the invention applied to a numerically even square array, namely, a six-by-six array having a total of thirty-six individual fuel rods 6. In this, as in any other numerically even square or rectangular array, the "egg crate" structure made up of the walls 1, 2, 3, and 4 may be constructed and arranged so that each cell 5 in the structure can accommodate four individual fuel rods. In this respect, the details of the bearing clips, the fuel rods, and their relation to an individual cell in the "egg crate" structure are exactly as described in connection with FIGS. 2 through 7. It should be understood that the tiers and columns of rods in the even square array shown in FIG. 8 may be increased in any direction by any multiple of two to form larger square or rectangular arrays and that it would not, in that event, be necessary to alter the construction of the clips or the "egg crate" structure in any significant respect.

Figure 9:
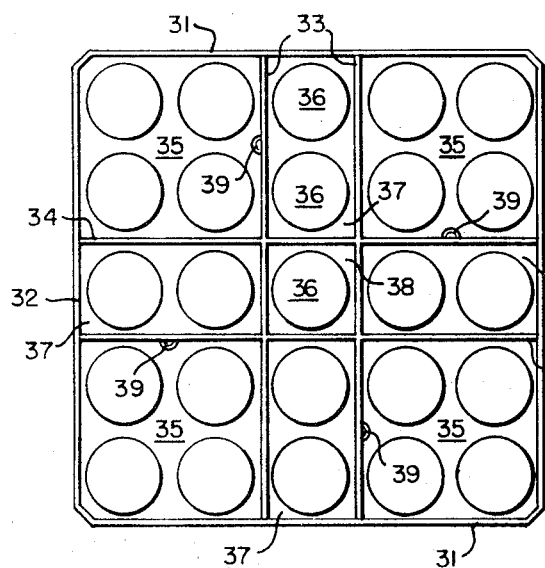
FIG. 9 illustrates the application of the invention to a reactor fuel assembly in which the fuel rods are arranged in a numerically odd, square array.

FIG. 9 illustrates one possible form of a numerically odd square array, namely, a five-by-five array having a total of twenty-five fuel rods. In FIG. 9, the peripheral walls of the "egg crate" structure are designated by the reference numerals 31 and 32, and the interior walls are designated by the reference numerals 33 and 34. In this embodiment, the interior walls are arranged to form individual cells 35 at the corners of the array, and each of these cells accommodate four individual fuel rods in a square array. The interior walls also bound cells 37 each of which accommodates two fuel rods 36. These cells are arranged in a cruciform around a central cell 38 in which there is only one fuel rod. Bearing clips for the rods in the cells 35 are identical to those described in connection with FIGS. 2 through 6. The same basic form of bearing clip is used to support the rods in the cells 37 and 38, the only modification which might have to be made being in the radial dimensions of the lands 12 and the bearing portions 16 to accommodate them to the slightly smaller dimensions of these cells.

Figure 10:
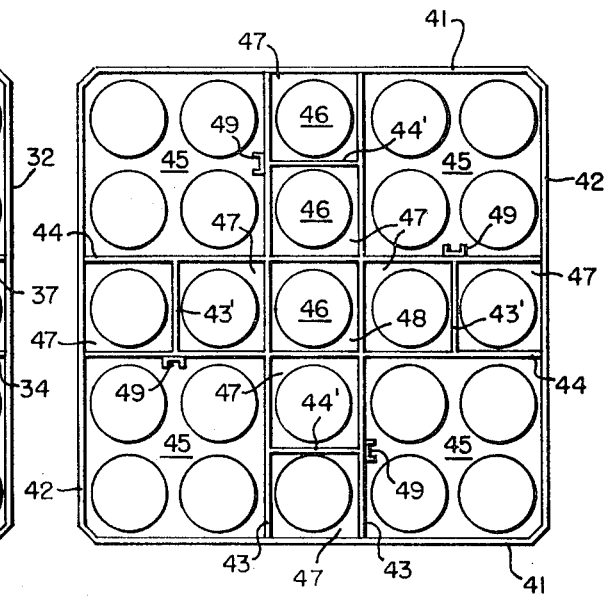
FIG. 10 illustrates another application of the invention to a reactor fuel assembly in which the fuel rods are arranged in a numerically odd square array.

Another numerically odd square array, also a five by-five array having a total of twenty-five individual fuel rods, is illustrated in FIG. 10. This embodiment includes an "egg crate" structure having peripheral walls 41 and 42 and internal walls 43 and 44, all of which are similar to corresponding walls in the embodiment shown in FIG. 9. In addition, there are interior walls 43' extending between the interior walls 44, and there are interior walls 44' extending between walls 43. In FIG. 10, as in FIG. 9, there are corner cells 45 each of which is constructed and arranged to accommodate four individual fuel rods. FIG. 10 differs from FIG. 9 in that there are cells 47 each of which accommodates a single fuel rod in a cruciform arrangement about central cell 48. Again, the bearing clips to be used on the fuel rods in the corner cells 45 and identical to those described in connection with FIGS. 2 through 6 and the bearing clips to be used on the fuel rods in the cells 47 and 48 will be of the same basic construction but may differ in their radial dimensions to accommodate them to the smaller space available.

The combined frictional forces between the "egg crate" structure and the bearing clips may be sufficient in some reactors to maintain the spacers at their predetermined positions along the fuel rods. However, under the operating conditions that obtain in most reactors, it is advantageous to provide means for positively maintaining the several "egg crate" structures in a fuel assembly at their intended positions along the fuel rods. Such means may be simple longitudinal stringers, such as the angle bars 20 in FIG. 8, or the half-round sections 39 in FIG. 9, or the U-shaped channels 49 in FIG. 10. In each embodiment, the stringers may extend the full length of the fuel rod, and they may be spot welded or otherwise secured to the "egg crate" structures. Extensions of the concept of a modular fuel rod spacer assembly as illustrated by the foregoing particular embodiments may readily be made. The scope of the invention is defined by the appended claims.

I claim:

1. A fuel rod spacer assembly for a nuclear reactor fuel assembly comprising:
    a cellular fuel rod grid spacer for providing lateral support for nuclear fuel rods at a position intermediate the ends of said fuel rods, said cellular spacer including one or more cells adapted to receive a plurality of fuel rods; and
    a plurality of bearing clips for laterally spacing and longitudinally retaining each fuel rod of the plurality of rods disposed in a single cell of said cellular fuel rod grid spacer, each of said bearing clips comprising a pair of longitudinally separated split ring rod embracing portions extending around individual fuel rods through an angle in excess of 180° of the circumference of said fuel rods, a pair of linking members for joining said split ring rod embracing portions together at their respective free ends, and means for releasably engaging said clip with said cellular spacer to prevent longitudinal displacement of said bearing clip.

2. A spacer assembly according to claim 1 wherein each of said split ring rod embracing portions are provided with dimpled fuel rod engaging portions.

3. A spacer assembly according to claim 2 wherein each of said split ring rod embracing portions are provided with four dimpled rod engaging portions at equally spaced locations which are angularly separated from each other by approximately 90°.

4. A spacer assembly according to claim 3 wherein each of said split ring rod portions is provided with a pair of bearing lands for bearing against the wall of the cellular spacer at two places separated by about 90°.

5. A spacer assembly according to claim 4 wherein each of said bearing lands is provided with a flow channel for permitting coolant flow.

6. A spacer assembly according to claim 1 wherein the means for releasably engaging the bearing clip with the cellular spacer to prevent longitudinal displacement comprises a pair of spring tabs.

7. A spacer assembly according to claim 5 wherein:
    the split rings are spaced from each other by approximately the width of the walls of the cellular spacer; and
    the means for releasably engaging the bearing clip with the cellular spacer to prevent longitudinal displacement comprises one or more spring tabs disposed on each of said split rings for overhanging opposite edges of the walls of said cellular spacer.

8. A spacer assembly according to claim 7 wherein said means for releasably engaging the bearing clip with the cellular spacer to prevent longitudinal displacement comprises a pair of spring tabs located on the extreme edges of said pair of split rings at positions adjacent to the lands and 90° apart.

9. A spacer assembly according to claim 1 wherein each of said linking members is provided at locations intermediate their ends with bearing sections extending radially outward beyond the peripheries of the split rings for resiliently bearing against corresponding sections of adjacent bearing clips.

References Cited
UNITED STATES PATENTS

| | | | |
|---|---|---|---|
| 3,049,485 | 8/1962 | Tatlock et al. | 176—76 X |
| 3,255,090 | 6/1966 | Leirvik | 176—78 X |
| 3,352,758 | 11/1967 | Anthony | 176—78 |
| 3,185,632 | 5/1965 | Bradley | 176—78 X |
| 2,990,359 | 6/1961 | Wyman | 176—81 |

CARL D. QUARFORTH, Primary Examiner

G. G. SOLYST, Assistant Examiner

U.S. Cl. X.R.

176—76